US010166970B2

(12) United States Patent
Debert et al.

(10) Patent No.: US 10,166,970 B2
(45) Date of Patent: Jan. 1, 2019

(54) CONTROL OF TORQUE TRANSMITTED TO THE DRIVING WHEEL OF A HYBRID MOTOR VEHICLE

(71) Applicant: RENAULT S.A.S, Boulogne-Billancourt (FR)

(72) Inventors: Maxime Debert, Versailles (FR); Celine Suard, La Norville (FR); Laurent Moity, Ollainville (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 431 days.

(21) Appl. No.: 14/904,340

(22) PCT Filed: Jun. 25, 2014

(86) PCT No.: PCT/FR2014/051590
§ 371 (c)(1),
(2) Date: Jan. 11, 2016

(87) PCT Pub. No.: WO2015/004361
PCT Pub. Date: Jan. 15, 2015

(65) Prior Publication Data
US 2016/0144850 A1 May 26, 2016

(30) Foreign Application Priority Data

Jul. 12, 2013 (FR) ...................... 13 56859

(51) Int. Cl.
*B60W 30/00* (2006.01)
*B60W 20/15* (2016.01)
(Continued)

(52) U.S. Cl.
CPC ............... *B60W 20/15* (2016.01); *B60K 6/20* (2013.01); *B60K 6/48* (2013.01); *B60K 6/52* (2013.01);
(Continued)

(58) Field of Classification Search
None
See application file for complete search history.

(56) References Cited

U.S. PATENT DOCUMENTS 9,254,833 B2 *  2/2016  Shin ...................... B60W 10/26
9,758,169 B2 *  9/2017  Umayahara ..... B60W 30/18127
(Continued)

FOREIGN PATENT DOCUMENTS

DE   10 2010 029 386 A1   12/2011
DE   10 2010 052 964 A1    5/2012
FR        2 954 441 A1    6/2011

OTHER PUBLICATIONS

International Search Report dated Sep. 16, 2014, in PCT/FR2014/051590 Filed Jun. 25, 2014.
(Continued)

Primary Examiner — Jonathan M Dager
(74) Attorney, Agent, or Firm — Oblon, McClelland, Maier & Neustadt, L.L.P.

(57) ABSTRACT

A method for controlling a mechanical torque transmitted to a driving wheel of a hybrid motor vehicle includes dividing a stroke of a vehicle acceleration pedal at a variable neutral point position into a first braking-adjustment stroke and a second acceleration-adjustment stroke, determining, within the first braking-adjustment stroke in which an electric motor of the vehicle operates as a generator, a regenerative braking torque setpoint for the electric motor based on a depression of the accelerator pedal and based on of a value of maximum energy recovery torque established based on a first function stored in a memory, and providing a value of maximum recovery torque depending on a vehicle speed. The first function assumes a value of substantially zero for an upper limit speed corresponding to the vehicle speed at
(Continued)

the moment of coupling and decoupling of the electric motor by a connection device of the vehicle.

10 Claims, 3 Drawing Sheets

(51) Int. Cl.
*B60K 6/48* (2007.10)
*B60K 6/52* (2007.10)
*B60W 30/18* (2012.01)
*B60W 20/40* (2016.01)
*B60K 6/20* (2007.10)
*B60W 10/08* (2006.01)
*B60W 10/26* (2006.01)

(52) U.S. Cl.
CPC ............ *B60W 10/08* (2013.01); *B60W 10/26* (2013.01); *B60W 20/40* (2013.01); *B60W 30/18127* (2013.01); *B60W 2510/083* (2013.01); *B60W 2520/10* (2013.01); *B60W 2540/10* (2013.01); *B60W 2540/12* (2013.01); *B60W 2710/08* (2013.01); *B60W 2710/083* (2013.01); *B60W 2710/244* (2013.01); *B60Y 2200/92* (2013.01); *B60Y 2300/182* (2013.01); *B60Y 2300/188* (2013.01); *B60Y 2400/81* (2013.01); *Y02T 10/6221* (2013.01); *Y02T 10/6265* (2013.01); *Y02T 10/92* (2013.01); *Y10S 903/93* (2013.01)

(56) References Cited

U.S. PATENT DOCUMENTS

| | | | | |
|---|---|---|---|---|
| 9,834,084 | B2* | 12/2017 | Kim | B60K 6/442 |
| 9,849,870 | B2* | 12/2017 | Morisaki | B60L 7/10 |
| 2012/0259494 | A1 | 10/2012 | Schaeffer et al. | |
| 2013/0065728 | A1* | 3/2013 | Eisele | B60L 7/10 |
| | | | | 477/4 |
| 2014/0046567 | A1* | 2/2014 | Schuler | B60L 11/1861 |
| | | | | 701/70 |
| 2014/0172211 | A1* | 6/2014 | Kim | B60L 15/2009 |
| | | | | 701/22 |
| 2014/0350814 | A1* | 11/2014 | Schuler | B60T 1/10 |
| | | | | 701/70 |
| 2015/0084760 | A1* | 3/2015 | Lee | B60T 1/10 |
| | | | | 340/439 |
| 2016/0059845 | A1* | 3/2016 | Nefcy | B60W 20/30 |
| | | | | 477/115 |
| 2016/0339906 | A1* | 11/2016 | Nefcy | B60K 6/547 |
| 2016/0368384 | A1* | 12/2016 | Johansson | B60L 3/102 |
| 2018/0118194 | A1* | 5/2018 | Kuang | F16D 48/06 |

OTHER PUBLICATIONS

French Preliminary Search Report dated Apr. 3, 2014, in FR 13 56859 Filed Jul. 12, 2013.

* cited by examiner

CONTROL OF TORQUE TRANSMITTED TO THE DRIVING WHEEL OF A HYBRID MOTOR VEHICLE

FIELD

The invention relates to a method for controlling a mechanical torque transmitted to at least one driving wheel of a hybrid motor vehicle by a powertrain comprising at least one heat engine, at least one electric motor, and a connection device allowing a coupling and a decoupling of at least the electric motor to said at least one driving wheel, in which method the stroke of an acceleration pedal of the vehicle is divided at a variable neutral point position into a first braking-adjustment stroke and a second acceleration-adjustment stroke.

The invention also relates to a control system and a hybrid motor vehicle.

BACKGROUND

A hybrid motor vehicle comprises at least one electric motor and at least one heat engine. This motor and engine can drive the same driving wheels or different driving wheels. In a hybrid operating mode the electric motor and heat engine simultaneously transmit a mechanical torque to at least one driving wheel, whether a positive engine torque or a resistive negative torque.

The invention relates to the category of these hybrid vehicles able to operate also in a purely combustion mode, in which only the heat engine transmits a mechanical torque to the driving wheels. Among the motor vehicles targeted by the invention, there is a category referred to as bi-mode, these vehicles also being capable of operating in a purely electric driving mode, in which the heat engine does not transmit any mechanical torque to the driving wheels.

To this end, it is known that the powertrain may comprise a connection device making it possible to selectively couple or decouple the electric motor and heat engine to/from the driving wheels. In other words, the connection device makes it possible to couple or decouple the heat engine to/from at least one driving wheel and makes it possible to couple or decouple the electric motor to/from at least one driving wheel, which may or may not be the same driving wheels. In the purely combustion/electric mode, only the heat engine/electric motor contributes to the traction, whereas in the hybrid mode the electric motor and heat engine can contribute to the traction. Reference is also made to clutching and declutching when a motor element is coupled to the wheel.

However, the invention also relates to motor vehicles that cannot operate in such a purely electric mode and that are able to operate only in the purely combustion mode and in the hybrid mode. In this case, the connection device makes it possible solely to couple or decouple the electric motor.

In the prior art it is also known, in the case of an electric motor working as an engine to drive the vehicle in purely electric driving mode or in hybrid driving mode, to operate this electric motor in accordance with a braking principle referred to as regenerative braking, i.e. with energy recovery. From an electrical viewpoint, the electric motor then works as a generator and converts the mechanical energy applied to its rotor into an electrical current, which can then be regulated in an electric motor controller as a current for charging a battery, for example intended to power the electric motor. In this regenerative braking mode the consumption of mechanical energy produced by the electrical conversion applies a braking torque to the wheels of the vehicle. On the one hand, the vehicle as a result can be at least partially braked with the aid of the electric motor operating as a generator, and on the other hand the kinetic energy recovered by the braking can be stored in electrochemical form in an accumulator or battery, this energy being reusable thereafter in order to propel the vehicle or for ancillary functions.

It is known that this regenerative braking can be controlled during braking phases per se, i.e. when the driver presses on the brake pedal of the vehicle. The invention does not relate to this field of control.

However, regenerative braking has been developed preferably so as to be controlled and implemented during phases of deceleration without braking, i.e. when the driver releases the pressure on the accelerator pedal without actuating the brake pedal, said pedal tending to lift. The invention relates to this field of control of mechanical torque. It is known to provide for the fact that the stroke of the acceleration pedal is divided at a neutral point, for which the torque transmitted to the wheels by the powertrain is zero, into a first braking-adjustment stroke and a second acceleration-adjustment stroke. Above the neutral point, the powertrain transmits an engine torque to the driving wheels. Below the neutral point, the powertrain transmits a resistive torque to the driving wheels.

This resistive torque can be wholly (apart from output) converted into electrical energy in the case of a purely electric operating mode. In the case of the hybrid operating mode, this resistive torque can be divided into a torque produced by the engine brake of the heat engine and into a regenerative braking torque by the electric motor, which converts the kinetic energy of its rotor into electricity.

Document FR-A1-2749229 in the name of the applicant states that the regenerative braking torque at the electric motor is dependent on the speed at which a foot is removed from the accelerator pedal.

Document FR-A1-2945243, also in the name of the applicant, states that the amplitude of the braking-adjustment stroke by the accelerator pedal is dependent on the charge of the battery.

These known solutions are satisfactory in the case of hybrid motor vehicles not subject to a coupling and to a decoupling of the electric motor and heat engine. However, these documents do not take into consideration a possibility of this type of clutching and declutching, and these solutions cannot be used in such cases.

In effect, this would result in problems with regard to the perceived comfort because, when a foot is removed from the accelerator pedal by the driver, the vehicle would brake too suddenly in the event of clutching: during phases of clutching and declutching, the transition from regenerative operation to non-regenerative operation and vice versa is disruptive for passengers due to a feeling of hard braking.

On the other hand, in the specific case envisaged by the invention of a bi-mode vehicle (capable of operating not only in hybrid mode but also in purely electric mode), the feeling perceived by passengers during phases of deceleration is not identical in the purely electric mode and in the hybrid mode, in particular during changes between modes as the vehicle is travelling.

SUMMARY

The objective of the present invention is to propose a solution for controlling a mechanical torque transmitted to at least one driving wheel of a hybrid motor vehicle, which solution overcomes the above-listed disadvantages.

In particular, one object of the invention is to provide a control solution of this type in the case of a powertrain ensuring a coupling and a decoupling of at least the electric motor to the driving wheels so as to be able to switch between a purely combustion mode and a hybrid mode, said solution having the following features:

- the provision of a progressiveness of the resistive torque in the zones approaching the coupling and decoupling phases, during the transition from hybrid mode to purely combustion mode,
- in the particular case envisaged by the invention of a bi-mode vehicle (capable of operating not only in hybrid mode but also in purely electric mode), the provision of a sensation of deceleration that is identical in the hybrid mode and in the purely electric mode in order to improve the comfort of passengers, in particular during transitions between modes during travel,
- a maximization of the amount of energy recovered in hybrid mode and possibly in purely electric mode,
- a regenerative braking torque fay the electric motor that can be proportioned by the driver.

These objects can be achieved by means of a method for controlling a mechanical torque transmitted to at least one driving wheel of a hybrid motor vehicle by a powertrain comprising at lease one heat engine, at least one electric motor, and a connection device allowing a coupling and a decoupling of at least the electric motor to said at least one driving wheel, in which method the stroke of an acceleration pedal of the vehicle is divided at a variable neutral point position into a first braking-adjustment stroke and a second acceleration-adjustment stroke, such that, within the first braking-adjustment stroke, in which the electric motor operates as a generator, a regenerative braking torque set/point for the electric motor is determined on the basis of the depression of the accelerator pedal by the driver and on the basis of a value of maximum energy recovery torque established on the basis of a first function stored in a memory and providing the value of maximum recovery torque depending on the speed of the vehicle, the first function assuming a value of substantially zero for an upper limit speed of the vehicle corresponding to the speed of the vehicle at the moment of coupling and decoupling of the electric motor by the connection device.

The regenerative braking torque setpoint is preferably a linear function of the depression of the accelerator pedal by the driver.

It may be that over a speed range of the vehicle comprised between a first lower limit speed of the vehicle and the upper limit speed of the vehicle, the first function has a first part starting from the first lower limit speed of the vehicle and at which the absolute value of the value of maximum recovery torque rises continuously with the speed of the vehicle and a second part terminating at the upper limit speed and at which the absolute value of the value of maximum recovery torque decreases continuously with the speed of the vehicle. The value of maximum recovery torque provided by the first function for the first lower limit speed of the vehicle is preferably substantially zero.

The method may comprise a step of determining the speed of the vehicle, a step of determining the depression of the accelerator pedal, and a step of defining the neutral point position of the accelerator pedal depending on the speed of the vehicle determined in the determining step, the regenerative braking torque setpoint being dependent on the neutral point position defined in the defining step. The position of the neutral point of the accelerator pedal is preferably defined on the basis of a second function stored in a memory and providing the position of the neutral point of the accelerator pedal depending on the speed of the vehicle, the second function assuming a value of substantially zero for the upper limit speed of the vehicle, which corresponds to the speed of the vehicle at the moment of coupling and decoupling of the electric motor by the connection device.

This can be implemented such that, within the second acceleration-adjustment stroke, the engine torque setpoint to be transmitted by the powertrain is established on the basis of a third function stored in a memory and providing the value of the engine torque setpoint on the basis of the speed of the vehicle, on the basis of the depression of the accelerator pedal by the driver, and on the basis of the neutral point position of the accelerator pedal.

A system for controlling a mechanical torque transmitted to at least one driving wheel of a hybrid motor vehicle by a powertrain of the vehicle may comprise at least one beat engine and at least one electric motor and a connection device enabling a coupling and a decoupling of at least the electric motor to said at least one driving wheel, the system comprising an accelerator pedal connected to an electronic control unit, and the electronic control unit being configured to apply to the driving wheel, depending on the depression of the accelerator pedal, an engine torque or a resistive torque transmitted by the powertrain, the electronic control unit comprising hardware and/or software elements which carry out the control method.

A hybrid motor vehicle may comprise a powertrain of the vehicle comprising at least one heat engine and at least one electric motor and a connection device enabling a coupling and a decoupling of at least the electric motor to said at least one driving wheel, said vehicle also comprising a control system of this type.

BRIEF DESCRIPTION OF THE DRAWINGS

Further advantages and features will become clearer from the following description of particular embodiments of the invention, given by way of non-limiting example and shown in the accompanying drawings, in which.

DETAILED DESCRIPTION

Figure 1:
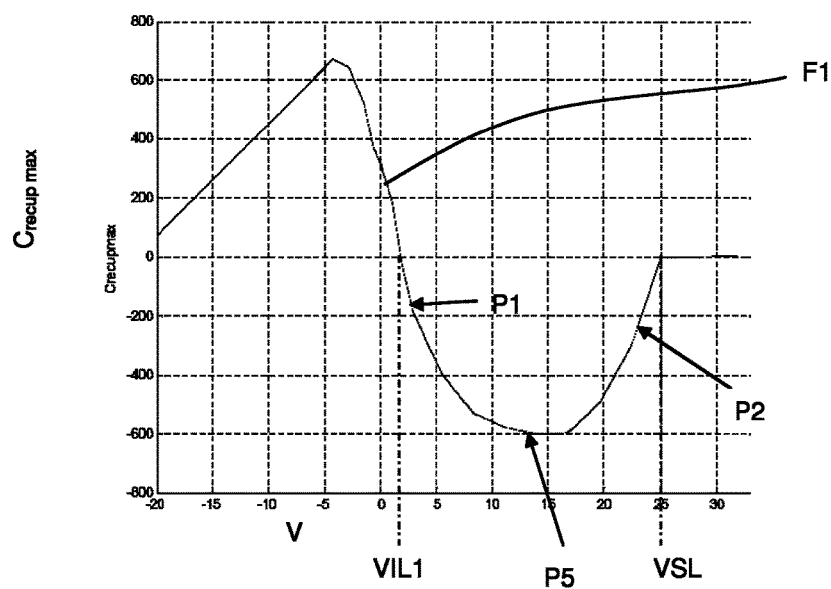
FIG. 1 shows an example of a first function F1 providing the value of maximum recovery torque denoted "$C_{recup\ max}$" on the basis of the speed of the vehicle denoted "V"

The invention described hereinafter with reference to FIGS. 1 to 5 relates to a method and a system 100 for controlling the mechanical torque transmitted to at least one driving wheel 106 of a hybrid motor vehicle. This mechanical torque is transmitted by a powertrain 102 comprising at least one heat engine 103 and at least one electric motor 104 and a connection device 105 enabling a coupling or clutching and a decoupling or declutching of at least the electric motor 104 to said at least one driving wheel 106. In addition, the connection device 105 may possibly enable the coupling or decoupling of the heat engine 103 to at least one driving wheel 106, independently or not of the coupling and decoupling of the electric motor 104 to at least one driving wheel 106, which may or may not be the same driving wheels 106.

The vehicle preferably has two front wheels 106 and two rear wheels 106 and has a heat engine 103 connected to the front suspension 106 as well as two electric motors 104 each one connected to one of the rear wheels 106 of the vehicle respectively.

In accordance with the method and the system 100 according to the invention the total displacement stroke of an acceleration pedal 101 of the vehicle, manipulated by the foot of the driver, is divided at the variable neutral point position into a first braking-adjustment stroke and a second acceleration-adjustment stroke. The neutral point position of the accelerator pedal 101 advantageously evolves within the pedal stroke depending on the actual speed of the vehicle, which will be referred to as "V" hereinafter. The principle applied by the method and the system 100 is that above the neutral point the powertrain 102 transmits to the driving wheels 106 an engine torque greater than 0, whereas below the neutral point the powertrain 102 transmits a resistive torque less than 0 to the driving wheels 106. It is therefore understood that the neutral point is defined as the point of the stroke of the accelerator pedal 101 for which the powertrain 102 transmits a torque of zero to the driving wheels 106.

In the following description, the actual percentage of the depression of the accelerator pedal 101 induced by the pressure of the foot of the driver is referred to as "y". The percentage of depression of the accelerator pedal 101 corresponding to the neutral point position thereof is referred to as "x", this percentage x evolving on the basis of the speed V (see the functions F2 in FIGS. 2 and 4). When y is greater than x and the driver wishes to accelerate by moving into the second acceleration-adjustment stroke, the engine torque setpoint of positive value to be transmitted to the driving wheels 106 by the powertrain 102 is denoted "$C_{mot}$", determined on the basis of the function F3 in FIG. 3. When, by contrast, y is lower than x and the driver wishes to decelerate by moving into the first braking-adjustment stroke, the resistive and regenerative torque setpoint of negative value to be transmitted to the driving wheels 106 by the powertrain 102 is denoted "$C_{recup}$".

Within the first braking-adjustment stroke, in which the electric motor 104 functions as a generator, the regenerative braking torque setpoint $C_{recup}$ for the electric motor 104 is determined on the basis of the depression y of the accelerator pedal 101 by the driver and on the basis of a value of maximum energy recovery torque denoted "$C_{recup\ max}$" (FIG. 1, expressed in N.m) established on the basis of a first function F1 stored in a memory and providing the value of maximum recovery torque $C_{recup\ max}$ on the basis of the speed V of the vehicle. The first function F1 essentially assumes a value of substantially zero for an upper limit speed denoted "VSL" of the vehicle, which corresponds to the speed V of the vehicle at the moment of coupling and decoupling of said at least one electric motor 104 to said at least one driving wheel 106 by the connection device 105.

FIG. 1 shows an example of a first function F1 of this type providing the value of maximum recovery torque denoted "$C_{recup\ max}$" on the basis of the speed of the vehicle denoted "V". The value of VSL is substantially equal to 25 m.s$^{-1}$, which corresponds to an envisaged speed for the vehicle during clutching and declutching of approximately 90 km·h$^{-1}$.

In a particularly advantageous embodiment, over a speed range of the vehicle comprised between a first lower limit speed of the vehicle, referred to as "VIL1" in FIG. 1, and the upper limit speed of the vehicle referred to as "VSL", the first function F1 has:

a first part P1, which starts from the first lower limit speed of the vehicle VIL1 and along which the absolute value of the value of maximum recovery torque $C_{recup\ max}$ rises continuously at the same time as the speed V of the vehicle, a second part P2, which terminates at the upper limit speed VSL and along which the absolute value of the value of maximum recovery torque $C_{recup\ max}$ decreases continuously at the same time as the speed of the vehicle, a potential part P5 connecting the first and second parts P1 and P2, this part P5 being formed of a peak (in absolute value) and maximum zone of the values likely to be assumed by $C_{recup\ max}$ in the speed range comprised between VIL1 and VSL.

In FIG. 1 the first lower limit speed VIL1 is approximately 2 m.s$^{-1}$. The peak zone corresponding to the part P5 is reached between approximately 13 and 17 m.s$^{-1}$. The first part P1, which corresponds to the part of the first function F1 corresponding to the speed range comprised between VIL1 and the start of the part P5, i.e. between approximately 2 and 13 m.s$^{-1}$, provides a continuously rising increase of the absolute value $C_{recup\ max}$ at the same time as V, to pass from 0 to approximately 600. The second part P2, which corresponds to the part of the first function F1 corresponding to the speed range comprised between the end of the part P5 and VSL, i.e. between approximately 17 and 25 m.s$^{-1}$, provides a continuously falling decrease of the absolute value of at the same time as V, to pass from 600 to approximately 0. Between VIL1 and VSL, the value assumed by $C_{recup\ max}$ is negative, such that the shape is an inverted bell.

In other words, in this preferred example, the value of maximum recovery torque $C_{recup\ max}$ provided by the first function F1 for the first lower limit speed VIL1 of the vehicle is substantially zero.

In the speed range V comprised between approximately −4 m.s$^{-1}$ (which corresponds to a speed in a forward gear of 4 m.s$^{-1}$) and VIL1, $C_{recup\ max}$ decreases continuously at the same time as the speed V, to pass from a maximum positive value of approximately 650 to 0. In the range of speeds below −4 m.s$^{-1}$, $C_{recup\ max}$ rises continuously at the same time as the speed V, to pass from a value of approximately 80 for a speed of −20 m.s$^{-1}$ to the maximum positive value of approximately 650 for the speed of −4 m.s$^{-1}$. In the range of speeds V less than VIL1, the value assumed by $C_{recup\ max}$ is positive.

It follows from the above, due to the existence of such a part P2 with continued decrease of the absolute value of $C_{recup\ max}$ and due to the fact that $C_{recup\ max}$ is substantially zero when the speed V of the vehicle is that provided for the implementation of the decoupling and the coupling of the electric motors 104 to the driving wheels 106, that the transition between the hybrid mode and the purely combustion mode is as transparent and gentle as possible for the driver. In effect, the regenerative torque provided at the moment of the transition between these two modes is then substantially zero, which corresponds to the behavior of the vehicle in purely combustion mode. On the other hand, the decrease of the absolute value of $C_{recup\ max}$ along the part P2 allows the driver to be able to easily proportion the level of energy recovery by the electric motor 104 of the powertrain 102. In addition, due to the existence of such a part P1 with continuous growth of the absolute value of $C_{recup\ max}$ at the same time as the speed V and due to the fact that $C_{recup\ max}$ is substantially zero when the speed V of the vehicle is approximately 2 m.s-1, it is possible to implement a transition between the combustion mode and a potential purely electric mode (in which the heat engine 103 does not transmit any torque to the driving wheels 106) that is as transparent and gentle as possible for the driver. All of these provisions make it possible to improve the comfort and pleasantness, whilst maximizing the amount of energy recovered by the electric motor 104 in the hybrid and purely electric modes.

The regenerative braking torque setpoint $C_{recup}$ is preferably a linear function of the depression y of the accelerator pedal 101 by the driver, whether proportional or not.

Thus, the method advantageously comprises a step of determining the speed V of the vehicle, a step of determining the depression y of the accelerator pedal 101, and a step of defining the neutral point position of the accelerator pedal 101 on the basis of the speed V of the vehicle determined in the determining step, the regenerative braking torque setpoint $C_{recup}$ being dependent on the neutral point position defined in the defining step. For example, the periodic or continuous determination of y and of V can be performed by measurement.

The regenerative braking torque setpoint $C_{recup}$ is preferably determined on the basis of the following formula (1):

$$C_{recup} = \max\left(\left(1 - \frac{y}{x}\right), 0\right) \times C_{recup\ max} \quad (1)$$

in which $C_{recup}$ is the regenerative braking torque setpoint, y is the percentage of depression of the accelerator pedal 101 by the driver, x is the percentage of depression of the accelerator pedal 101 corresponding to the neutral point position thereof, $C_{recup\ max}$ is the value of the maximum recovery torque.

In accordance with formula (1), the value of $C_{recup}$ is zero if y is greater than x. Thus, if the accelerator pedal 101 is pressed above the neutral point (which itself varies on the basis of the speed V), $C_{recup}$ is zero and conversely it will be sought to transmit a positive engine torque by the powertrain 102.

On the contrary, the value of $C_{recup}$ is equal, if y is less than x, to the product between $C_{recup\ max}$ previously obtained with the aid of the function F1 (on the basis of V determined for example by measurement) and the factor corresponding to the difference between 1 and the quotient between y and x. Thus, if the accelerator pedal 101 is pressed below the neutral point (which itself varies on the basis of the speed V), $C_{recup}$ of negative value is calculated by the formula (1).

The position of the neutral point of the accelerator pedal 101, which is defined in particular by the value x of the percentage of depression of the accelerator pedal 101 corresponding to the neutral point position thereof, is preferably defined on the basis of a second function F2, which is stored in a memory and provides the position of the neutral point of the accelerator pedal 101, i.e. the value x, on the basis of the speed V of the vehicle.

Figure 2:
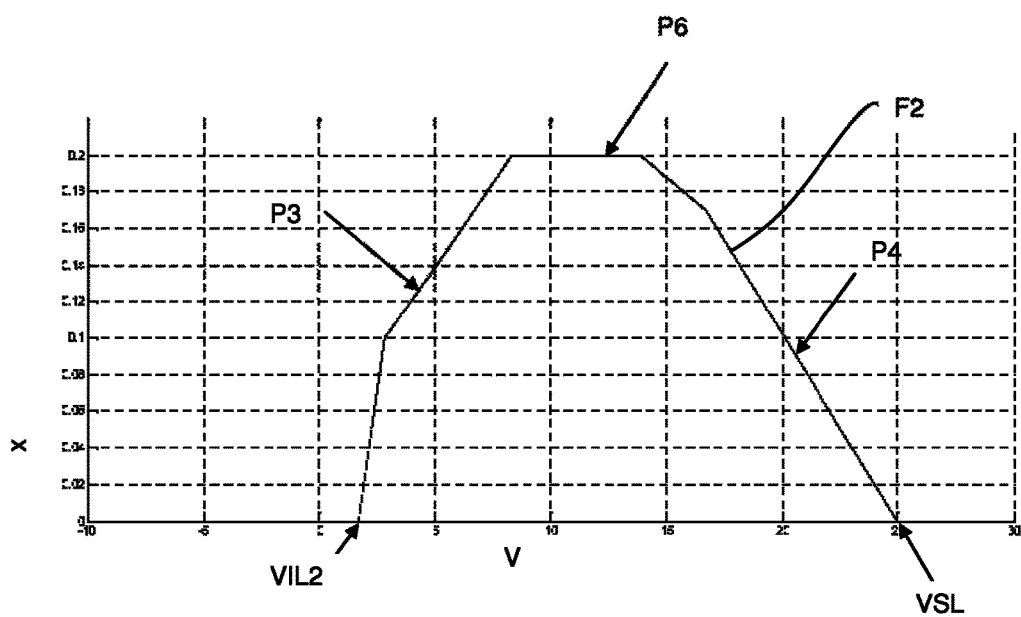
FIG. 2 shows an example of a second function F2 providing, on the basis of the positive speed of the vehicle V (travel in a forward gear), the percentage of depression of the accelerator pedal corresponding to the neutral point position, denoted "x"

FIG. 2 shows an example of a second function F2 of this type providing, on the basis of the positive speed of the vehicle V (in the case of travel in a forward gear), the percentage of depression of the accelerator pedal 101 corresponding to the neutral point position, denoted "x". The figure shows that the second function F2 preferably assumes a value of substantially zero when V is equal to the upper limit speed VSL (which corresponds to the speed of the vehicle at the moment of coupling and decoupling of the electric motor 104 by the connection device 105). The figure also shows that, over the speed range of the vehicle comprised between a second lower limit speed of the vehicle, denoted "VIL2", and the upper limit speed VSL of the vehicle, the second function F2 preferably has:

- a first part P3, which starts from the second lower limit speed VIL2 of the vehicle and along which the value of the percentage of depression of the accelerator pedal 101 corresponding to the neutral point position thereof, i.e. the value of x, rises continuously at the same time as the speed of the vehicle,
- a second part P4, which terminates at the upper limit speed VSL and along which the value of the percentage of depression of the accelerator pedal 101 corresponding to the neutral point position thereof, i.e. the value of x, decreases continuously at the same time as the speed of the vehicle,
- a potential part P6 connecting the first and second parts P3 and P4, this part P5 being formed of a peak and maximum zone of the values likely to be assumed by x in the speed range comprised between VIL2 and VSL.

The first lower limit speed VIL1 of FIG. 1 is advantageously substantially equal to the second lower limit speed VIL2 of FIG. 2.

In FIG. 2 the second lower limit speed VXL2 is approximately 2 m.s$^{-1}$. The peak zone corresponding to the part P6 is reached between approximately 8 and 14 m.s$^{-1}$ to reach the maximum value of approximately 20%. The first part P3, which corresponds to the part of the second function F2 corresponding to the speed range comprised between VIL2 and the start of the part P6, i.e. between approximately 2 and 8 m.s$^{-1}$, provides a continuously rising increase of the percentage x at the same time as V, to pass from. 0% to approximately 20%. The second part P4, which corresponds to the part of the second function F2 corresponding to the speed range comprised between the end of the part P6 and VSL, i.e. between approximately 14 and 25 m.s$^{-1}$, provides a continuously falling decrease of the percentage x at the same time as V, to pass from approximately 20% to 0%.

In other words, in this preferred example, the value of the percentage of depression of the accelerator pedal 101 corresponding to the neutral point position thereof, i.e. the value of x, provided by the second function F2 when the speed V is equal to the second lower limit speed VIL2, is substantially zero.

The decrease of x provided along the part P4 makes it possible, by approaching the speed of the vehicle provided for the implementation of the decoupling and coupling of the electric motors 104 to the driving wheels 106, for the transition between the hybrid mode and the purely combustion mode to be as transparent and gentle as possible for the driver. This makes it possible specifically to approach a normal behavior of a purely combustion-powered vehicle, for which the conventional value of x is always equal to 0%. In effect, in a purely combustion mode, the accelerator pedal 101 serves solely over its entire stroke to adjust the acceleration, a position corresponding to a percentage x equal to 0% serving for the engine braking procured solely by the heat engine 103. The progressiveness of the value of x between VIL2 and VSL, therefore of the neutral position of the accelerator pedal 101, allows the driver to not be surprised by a braking that is too harsh and to have time to proportion his deceleration, the slope along the part P4 preferably being calculated such that the driver can feel the deceleration and act thereon. It is also a reason why x is substantially equal to 0% when V is equal to VSL.

Figure 4:
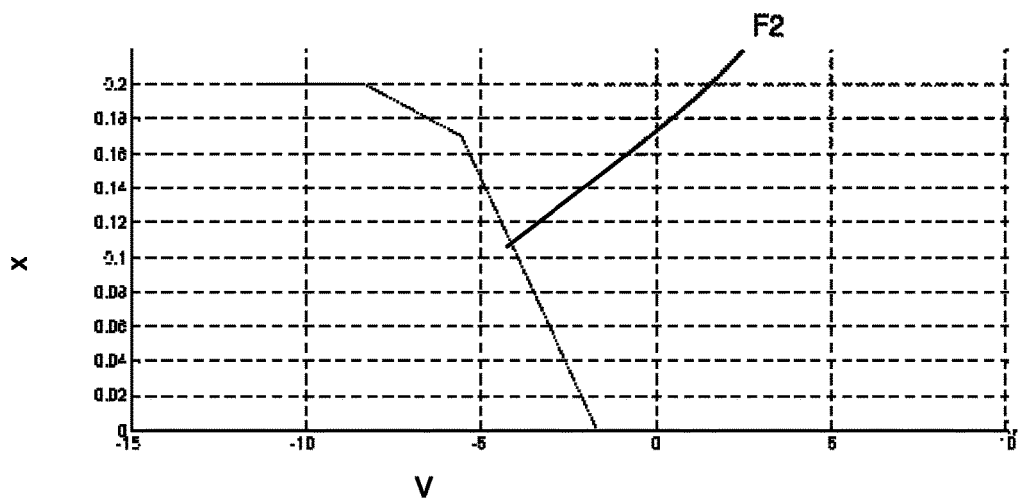
FIG. 4 shows an example of a second function F2 providing, on the basis of the negative speed of the vehicle V (travel in reverse gear), the percentage of depression of the accelerator pedal corresponding to the neutral point position, still denoted "x".
Figure 5:
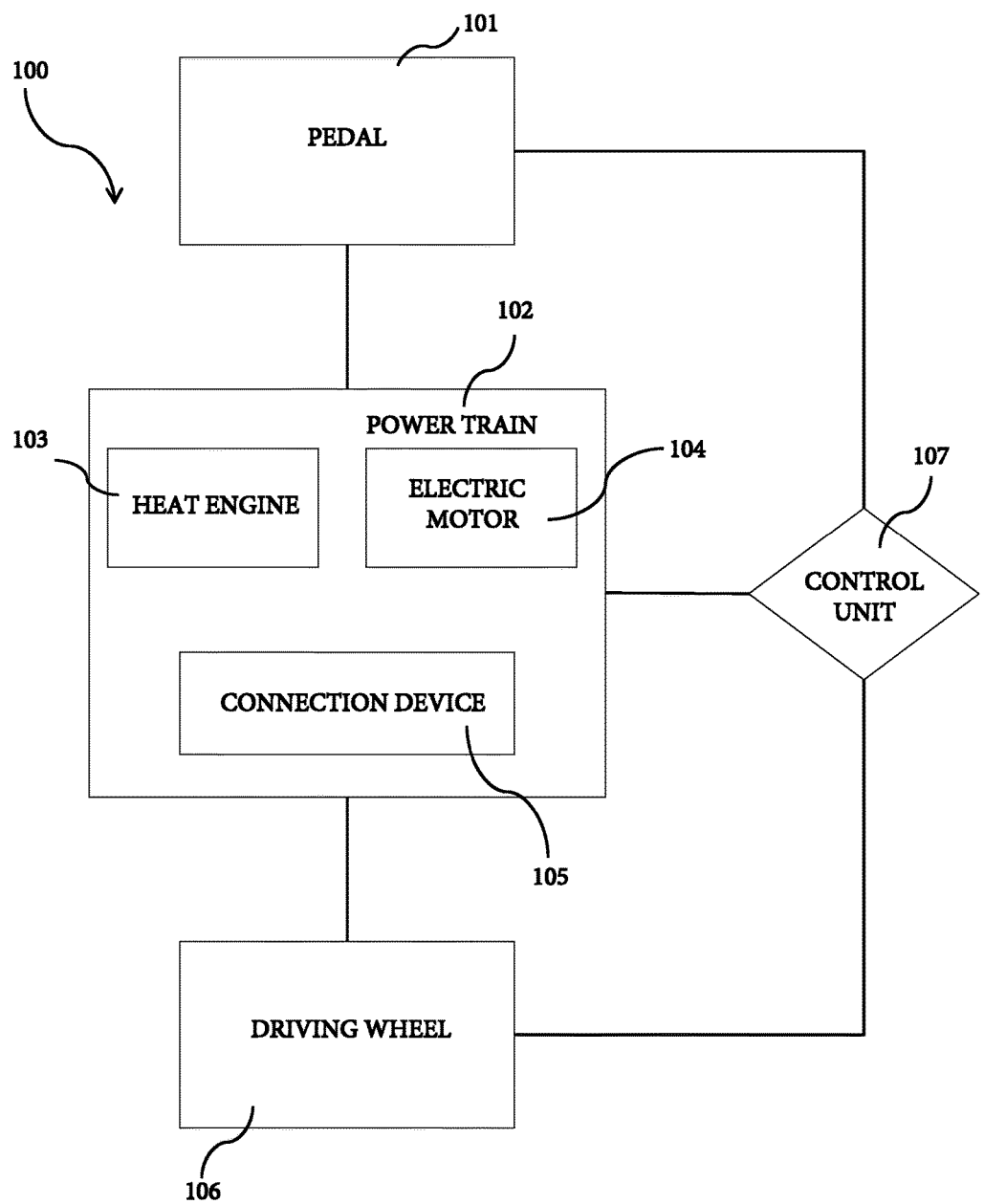
FIG. 5 shows the system for controlling a torque transmitted to a driving wheel.

FIG. 4 shows an example of a second function F2 of this type providing the percentage of depression of the accelerator pedal 101 corresponding to the neutral point position, i.e. the value of x, on the basis of the negative speed of the vehicle V, in conditions of travel in a forward gear (for speeds V lower than 0). It decreases continuously between approximately -8 m.s-1 and -2 m.s-1, to pass from approximately 20% to 0%. The value of x is zero between -2 m.s-1 and 0 m.s-1. By contrast, the value of x is kept substantially constant, for example substantially equal to 20%, for speeds V lower than -8 m.s-1. These values of x in conditions of reverse gear of the vehicle can be introduced into formula (1) in order to be able to manage the energy recovery in such conditions. The first function F1 can also be used in the same way as in conditions of travel in a forward gear.

The strategy of controlling the resistive torque of negative value to be transmitted to the driving wheels 106 by the powertrain 102 when the accelerator pedal 101 is positioned in the first braking-adjustment stroke, i.e. when y is lower than x, has been described above. Hereinafter what will be described is a strategy for controlling the positive-value engine torque to be transmitted to the driving wheels 106 by the powertrain 102 when the accelerator pedal 101 is positioned in the second acceleration-adjustment stroke, i.e. when y is greater than x.

Generally, within the second acceleration-adjustment stroke, the engine torque setpoint $C_{mot}$ to be transmitted by the powertrain 102 is established on the basis of a third function F3 stored in a memory and providing the value of the engine torque setpoint Cmot on the basis of the speed V of the vehicle, on the basis of the depression y of the accelerator pedal 101 by the driver, and on the basis of the neutral point position of the accelerator pedal 101, i.e. on the basis of x.

The third function F3 preferably assumes at the input the speed V of the vehicle and an input variable denoted "z" established on the basis of the depression y of the accelerator pedal 101 by the driver and on the basis of the neutral point position of the accelerator pedal 101, i.e. on the basis of x, in accordance with the following formula (2):

$$z = \frac{y-x}{1-x} \quad (2)$$

in which z is said input variable, y is the percentage of depression of the accelerator pedal 101 by the driver, and x is the percentage of depression of the accelerator pedal 101 corresponding to the neutral point position thereof.

Figure 3:
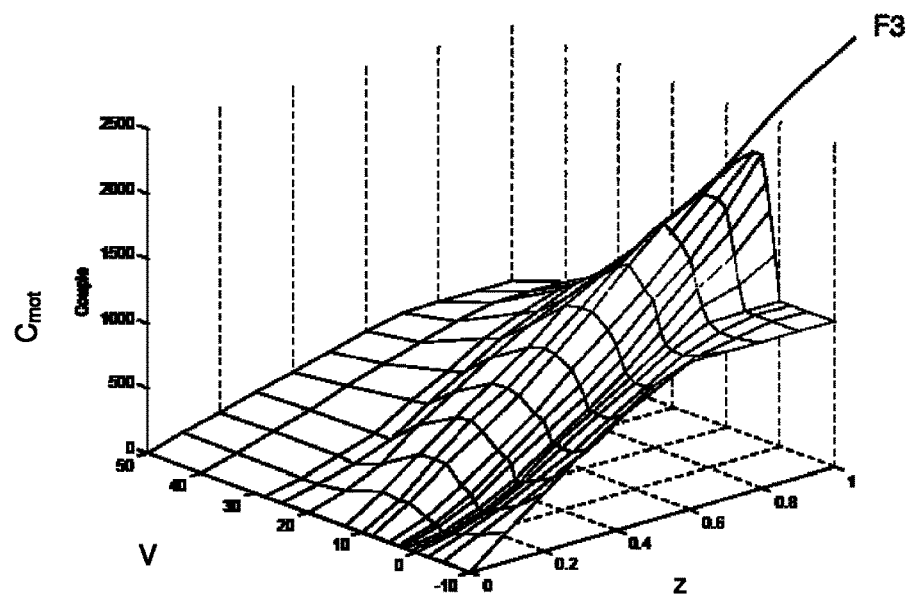
FIG. 3 shows an example of a third function F3 providing the positive engine torque denoted "$C_{mot}$" on the basis of the variable "z" representing the percentage of depression of the accelerator pedal and the positive speed of the vehicle V.

FIG. 3 shows an example of a third function F3 of this type providing the positive engine torque $C_{mot}$ on the basis of the variable z constructed with the aid of formula (2) and on the basis of the positive speed of the vehicle V determined for example by periodic or continuous measurement. Thus, for a neutral position of the pedal 101 corresponding to a percentage of depression x equal to 0%, a conventional behavior of a purely combustion-powered vehicle, i.e. devoid of electric motor 104 for driving or braking, is regained. The variable z thus constructed serves to establish cmot on the basis of the speed of the vehicle in accordance with the third function F3, which may advantageously be the conventional mapping of the engine torque control for a vehicle having solely combustion-powered traction, i.e. a vehicle that is not a hybrid vehicle.

Thus, an operation of the control strategy may be as follows:

The three functions F1, F2 and F3 are pre-established and stored in one or more memories. Then, during use of the vehicle, the speed V and the depression y of the pedal 101 are determined periodically or continuously. On the basis of the value of V, the value of x is first established with the aid of the second function F2, of which an example is illustrated in FIGS. 2 and 4, depending on the conditions of travel in a forward gear or reverse gear.

Then, if y is greater than x, the first function F1 is used, of which an example is illustrated in FIG. 1: the determination of V makes it possible to establish the value of maximum recovery torque $C_{recup\ max}$ admissible at this speed. Then, also knowing y, which has been determined previously, and x, which has been established previously, formula (1) makes it possible to determine the regenerative braking torque setpoint by the electric motor 104 $C_{recup}$ of negative value, which corresponds to a depression y of the accelerator pedal 101 below the neutral point position x.

By contrast, if x is greater than y, the third function F3 is used, of which an example is illustrated in FIG. 3. Beforehand, the variable z is calculated with the aid of formula (2), on the basis of the knowledge of x and of y. This third function makes it possible to know the engine torque setpoint $C_{mot}$, of positive value, which corresponds to a depression y of the accelerator pedal 101 above the neutral point position x.

The control system 100 comprises an accelerator pedal 101 connected to an electronic control unit 107, and the electronic control unit 107 is configured to impose on said at least one driving wheel 106, on the basis of the depression y of the accelerator pedal 101, an engine torque corresponding to the setpoint $C_{mot}$ described above or a resistive torque corresponding to the setpoint $C_{recup}$ described above, transmitted by the powertrain 102. The electronic control unit 107 comprises hardware and/or software elements which implement the control method detailed above.

Lastly, the invention also relates to a hybrid motor vehicle, comprising on the one hand a powertrain 102 of the vehicle comprising at least one heat engine 103 and at least one electric motor 104 and a connection device 105 enabling a coupling and a decoupling of at least the electric motor 104 to said at least one driving wheel 106, and on the other hand the control system described in the paragraph above.

The invention also relates to a data recording medium that can be read by a computer, on which a computer program is stored comprising computer program code means for carrying out the method.

It should be noted that the field of application of the control strategy according to the invention is limited to motor vehicles belonging to the category of hybrid motor vehicles capable of operating also in a purely combustion mode, in which only the heat engine 103 transmits a mechanical torque to the driving wheels 106. These may be, indifferently, motor vehicles referred to as bi-mode vehicles capable also of operating in a purely electric driving mode, in which only the electric motor 104 transmits a mechanical torque to the driving wheels 106, or motor vehicles that cannot operate in a purely electric mode of this type and are capable of operating only in the purely combustion mode and the hybrid mode.

The invention claimed is:

1. A method for controlling a mechanical torque transmitted to at least one driving wheel of a hybrid motor vehicle by a powertrain including at least one heat engine, at least one electric motor, and a connection device allowing a coupling and a decoupling of at least the electric motor to said at least one driving wheel, the control method comprising:

dividing a stroke of an acceleration pedal of the vehicle at a variable neutral point position into a first braking-adjustment stroke and a second acceleration-adjustment stroke;

determining, within the first braking-adjustment stroke in which the electric motor operates as a generator, a regenerative braking torque setpoint for the electric motor based on a depression of the accelerator pedal by a driver and based on a value of maximum energy recovery torque established based on a first function stored in a memory; and providing the value of maximum energy recovery torque based on a speed of the vehicle, wherein the first function assumes a value of substantially zero for an upper limit speed of the vehicle corresponding to the speed of the vehicle at the moment of coupling and decoupling of the electric motor by the connection device.

2. The control method as claimed in claim 1, wherein the regenerative braking torque setpoint is a linear function of the depression of the accelerator pedal by the driver.

3. The control method as claimed in claim 1, wherein, over a range of the speed of the vehicle comprised between a first lower limit speed of the vehicle and the upper limit speed of the vehicle, the first function has a first part starting from the first lower limit speed of the vehicle and at which an absolute value of the value of maximum energy recovery torque rises continuously with the speed of the vehicle and a second part terminating at the upper limit speed and at which the absolute value of the value of maximum energy recovery torque decreases continuously with the speed of the vehicle.

4. The control method as claimed in claim 3, wherein the value of maximum energy recovery torque provided by the first function for the first lower limit speed of the vehicle is substantially zero.

5. The control method as claimed in claim 1, further comprising:

determining the speed of the vehicle;

determining the depression of the accelerator pedal; and defining the neutral point position of the accelerator pedal based on the speed of the vehicle determined by the determining the speed of the vehicle, the regenerative braking torque setpoint based on the neutral point position defined by the defining.

6. The control method as claimed in claim 5, wherein the position of the neutral point of the accelerator pedal is defined based on a second function stored in a memory and providing the position of the neutral point of the accelerator pedal based on the speed of the vehicle, the second function assuming a value of substantially zero for the upper limit speed of the vehicle, which corresponds to the speed of the vehicle at the moment of coupling and decoupling of the electric motor by the connection device.

7. The control method as claimed in claim 1, wherein, within the second acceleration-adjustment stroke, an engine torque setpoint to be transmitted by the powertrain is established based on a third function stored in a memory and providing a value of the engine torque setpoint based on the speed of the vehicle, the depression of the accelerator pedal by the driver, and the neutral point position of the accelerator pedal.

8. A system for controlling a mechanical torque transmitted to at least one driving wheel of a hybrid motor vehicle by a powertrain of the vehicle including at least one heat engine, at least one electric motor, and a connection device enabling a coupling and a decoupling of at least the electric motor to said at least one driving wheel, the system comprising:

an accelerator pedal connected to an electronic control unit, the electronic control unit being configured to apply to the driving wheel, depending on a depression of the accelerator pedal, an engine torque or a resistive torque transmitted by the powertrain, wherein the electronic control unit is configured to:

divide a stroke of an acceleration pedal of the vehicle at a variable neutral point position into a first braking-adjustment stroke and a second acceleration-adjustment stroke, determine, within the first braking-adjustment stroke in which the electric motor operates as a generator, a regenerative braking torque setpoint for the electric motor based on a depression of the accelerator pedal by a driver and based on a value of maximum energy recovery torque established based on a first function stored in a memory, and provide the value of maximum energy recovery torque based on a speed of the vehicle, wherein the first function assumes a value of substantially zero for an upper limit speed of the vehicle corresponding to the speed of the vehicle at the moment of coupling and decoupling of the electric motor by the connection device.

9. A hybrid motor vehicle, comprising:

the powertrain of the vehicle including the heat engine, the electric motor, and the connection device enabling the coupling and the decoupling of at least the electric motor to at least one driving wheel; and the control system as claimed in claim 8.

10. A non-transitory computer readable medium storing a computer program that, when executed by a computer, causes the computer to perform a method, the method comprising:

dividing a stroke of an acceleration pedal of the vehicle at a variable neutral point position into a first braking-adjustment stroke and a second acceleration-adjustment stroke;

determining, within the first braking-adjustment stroke in which the electric motor operates as a generator, a regenerative braking torque setpoint for the electric motor based on a depression of the accelerator pedal by a driver and based on a value of maximum energy recovery torque established based on a first function stored in a memory; and providing the value of maximum energy recovery torque based on a speed of the vehicle, wherein the first function assumes a value of substantially zero for an upper limit speed of the vehicle corresponding to the speed of the vehicle at the moment of coupling and decoupling of the electric motor by the connection device.

* * * * *